United States Patent [19]

Lema

[11] Patent Number: 5,628,974

[45] Date of Patent: May 13, 1997

[54] PROCESS FOR TREATING BY-PRODUCTS OF LITHIUM/SULFUR HEXAFLUORIDE

[75] Inventor: Luis E. Lema, North Attleboro, Mass.

[73] Assignee: The United States of America as represented by the Secretary of the Navy, Washington, D.C.

[21] Appl. No.: 499,244

[22] Filed: Jul. 7, 1995

[51] Int. Cl.$^6$ .................................................. C01D 15/00
[52] U.S. Cl. ........................................ 423/179.5; 423/563
[58] Field of Search ........................... 423/179.59, 563

[56] References Cited

U.S. PATENT DOCUMENTS

| 3,523,751 | 8/1970 | Burkert et al. | 423/179.5 |
| 4,655,828 | 4/1987 | Yates et al. | 423/179.5 |

FOREIGN PATENT DOCUMENTS 785979  11/1957  United Kingdom ............... 423/179.5

*Primary Examiner*—Wayne Langel
*Attorney, Agent, or Firm*—Michael J. McGowan; Prithvi C. Lall; Michael F. Oglo

[57] ABSTRACT

A process is provided for treating the solid reaction by-products of lithium and sulfur hexafluoride. Lithium in the by-product solid waste is converted to lithium hydroxide. Lithium sulfide in the by-product is converted to lithium hydroxide. Lithium sulfide in the by-product is reacted with an acid to form a water soluble salt and hydrogen sulfide. The hydrogen sulfide is converted to an alkali metal sulfate. Solid aluminum oxide and lithium fluoride are recovered as a feed in the production of aluminum. Remaining lithium salts in solution are converted to lithium carbonate.

2 Claims, 1 Drawing Sheet

PROCESS FOR TREATING BY-PRODUCTS OF LITHIUM/SULFUR HEXAFLUORIDE

STATEMENT OF GOVERNMENT INTEREST

The invention described here in may be manufactured and used for the Government of the United States of America for governmental purposes without the payment of any royalties thereon or therefor.

BACKGROUND OF THE INVENTION

(1) Field of the Invention

This invention relates to disposal of solid waste disposal and particularly to a process for treating by-products of the lithium/sulfur hexafluoride reaction in order to prevent potential environmental problems and to reduce overall product costs.

(2) Description of the Prior Art

The reaction of lithium and sulfur hexafluoride is utilized as an energy source to power a torpedo. A mixture of lithium and sulfur hexafluoride are placed in the boiler portion of a torpedo and ignited using a charge of pure aluminum and potassium perchlorate. This produces heat to boil a working fluid which is used to drive the propeller of the torpedo. The spent fuel produced is primarily a solid cake of lithium sulfide and lithium fluoride, potassium fluoride and aluminum oxide with a small amount of unreacted lithium. Upon completion of a test with a torpedo, the spent fuel must be treated to render it environmentally acceptable safe level and for recycling to produce additional fuel components. Such a treatment is difficult since lithium reacts slowly in air and violently with water to produce hydrogen gas. In addition, lithium fluoride is both toxic and insoluble in most solvents. It has been proposed to fragment the solid by-product matrix with a pulsed high velocity water stream in order to provide ease for further treatment. This process is dangerous since hydrogen gas produced is dangerous besides lithium fluoride being toxic.

It has also been proposed to preliminarily treat the solid waste by-product to evaporate the lithium metal portion of the solid waste in an inert gas atmosphere at 500° F. However, this process is dangerous and expensive.

U.S. Pat. No. 4,655,828 to Yates et al utilizes a solution of a Lewis acid in an organic solvent in order to dissolve the salt phase of the solid waste. While this process provides a means for recovering metallic lithium, it does not provide a means for treating the lithium sulfide and lithium fluoride portions of the solid waste. Other methods to extract lithium in some form have been described in the U.S. Patents such as U.S. Pat. No. 4,588,566 to Kluksdahl; U.S. Pat. No. 4,594,076 to Castrantas; U.S. Pat. No. 4,285,914 to Davidson; U.S. Pat. No. 3,523,751 to Burkert et al using different methods. However, none of these references addresses the extraction of other environmentally unsafe by-products besides lithium from the sold waste by-products from lithium-hexaflouride reaction.

It would be desirable to provide a process for treating the solid waste from a lithium/sulfur hexafluoride fuel reaction in order to produce an environmentally acceptable safe product, by extracting most of the compounds in the by-product and wherein at least a portion of lithium can be recycled to produce additional fuel.

SUMMARY OF THE INVENTION

The present invention provides a multistep process for treating the solid waste from the reaction of lithium with sulfur hexafluoride after residual lithium has been removed from the solid waste such as by evaporation at about 500° F. The remaining solid waste is reduced in particle size by grinding and is mixed with water to effect reaction of any minor or trace amounts of lithium to form lithium hydroxide. The remaining solid waste comprising lithium sulfide, lithium fluoride aluminum oxide and potassium chloride is then reacted with hydrochloric acid to convert lithium hydroxide and lithium sulfide to lithium chloride. Hydrogen sulfide gas produced as a by-product is treated in an alkaline scrubber using sodium hydroxide solution. The remaining solid containing, primarily lithium fluoride, aluminum oxide are filtered out with lithium chloride and potassium chloride remaining in the solution. The solid mixture of lithium fluoride and aluminum oxide can be isolated for use as a depolarizing agent in the aluminum industry. The recovered solution contains lithium chloride, and potassium chloride. The hydrogen sulfide gas is treated with caustic soda solution and with hydrogen peroxide. The soluble lithium salts then are mixed with sodium carbonate to form solid lithium carbonate which is then recovered for using as fuel. The process of this invention provides for the elimination and utilization of aluminum by-products. In addition, unspent lithium can be recovered as lithium carbonate and lithium hydroxide which can be further treated to recover lithium. In addition, the mixture of lithium fluoride and aluminum oxide recovered in this process using the teaching of this invention can be utilized directly in the aluminum industry.

An object of subject invention is to treat the spent fuel for a torpedo battery in an environmentally acceptable fashion.

Another object of subject invention is to recycle the spent fuel to obtain by-products usable in the aluminum industry.

Still another object of subject invention to recover the unspent lithium as fuel for future use.

Other objects and advantages of the present invention will be made clearer in the following description in conjunction with the drawings wherein:

BRIEF DESCRIPTION OF THE DRAWING

The single figure depicts diagrammatically a process for extracting various products from the spent fuel according to the teachings of subject invention.

DESCRIPTION OF THE PREFERRED EMBODIMENT

Figure 1:
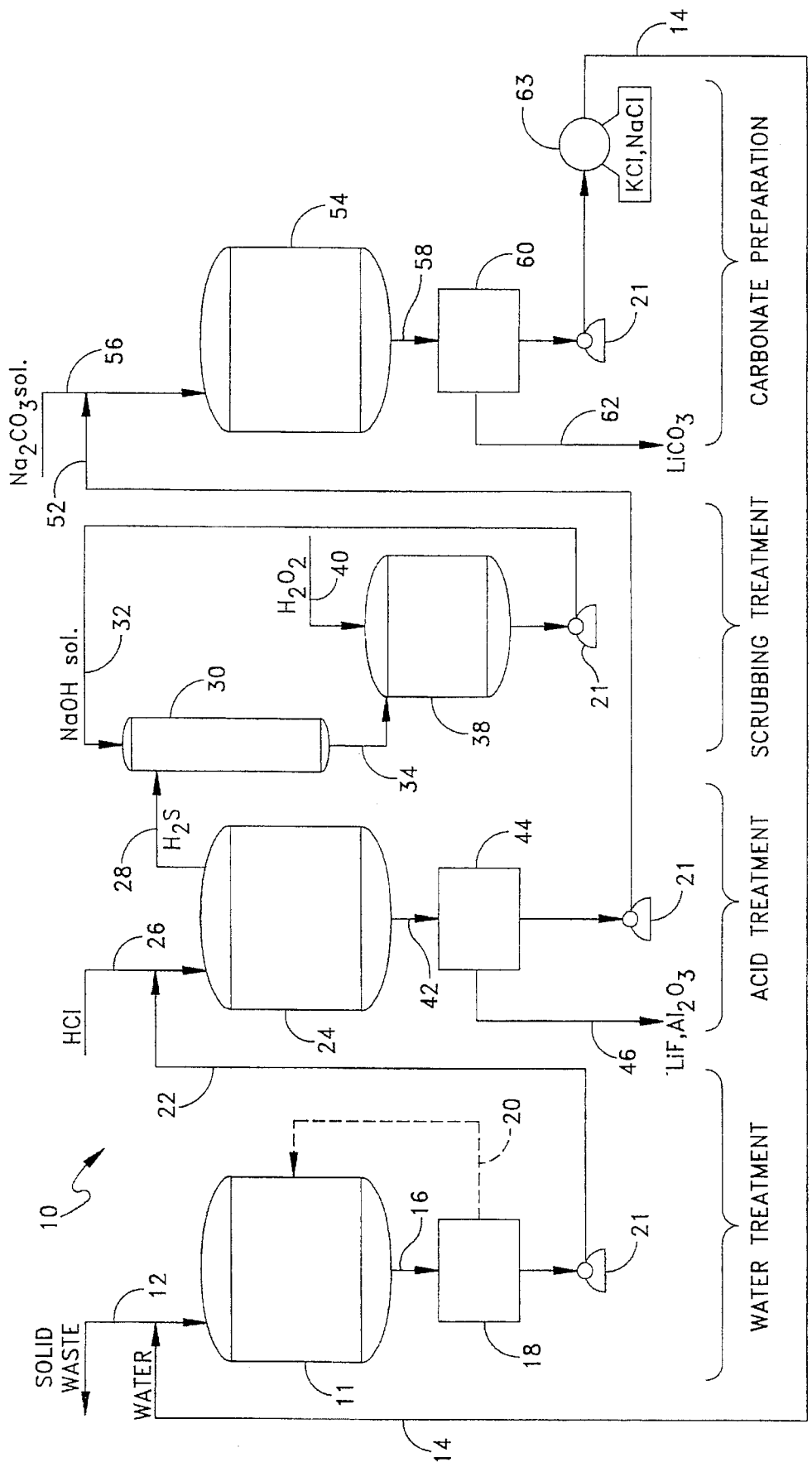

The products which are treated in accordance with this invention are obtained from the following reaction:

$$9Li + SF_6 \xrightarrow{900°\ C} Li_2S + 6LiF + Li \qquad (1)$$

The solid waste by-product is first treated in a conventional manner to separate the unused lithium from the rest of the solid waste products. This can be accomplished by evaporation at a temperature of about 500° F. in the atmosphere of an inert gas such as argon or the like.

After removing the unused lithium, the remaining solid waste by-product is ground in an aqueous environment to increase the reaction during the various processing steps. The system designated as 10 used for the process as shown in the accompanying figure as a way of illustration and not as a limitation remaining lithium metal is reacted with water brought by pipe or conduit 14 into tank or reactor 11 wherein the finely ground solid waste by-product is brought into tank 11 by pipe 12. Any unspent lithium reacts with water as follows:

$$2Li + 2H_2O \rightarrow 2LiOH + H_2 \qquad (2)$$

A small amount of the lithium hydroxide will dissolve in the water. The remaining by-products including lithium sulfide and lithium fluoride are separated out as insolubles in water and solubles like potassium fluoride, potassium sulfide and aluminum oxide will remain in water. The operating temperature for this treatment is about room temperature. When overall heat from the reaction represented by equation (2) is high, i.e., a significant amount of lithium is left from the first step; then some lithium hydroxide from a previous treatment may be needed to control the rate of the hydrogen generation in the reaction. The aqueous/solids mixture, obtained after the reaction is complete is indicated by no more hydrogen generation. After the reaction is complete in reactor 11, the mixture is then filtered using conduit 16 and filter 18. A portion of the solids recovered is circulated by pump 21 to tank 11 via pipe 20 for the lithium reaction to complete by the water treatment step in tank 11.

The solids/water mixture obtained is then directed through pipe 22 to a second reactor or tank 24 for reaction with an acid such as hydrochloric acid brought into reactor 24 by using pipe 26. The following reaction takes place during this step called acid treatment.

It is to be noted that this step will be described using hydrochloric acid. However, this description is equally applicable to other acids without deviating from the teachings subject invention:

$$LiOH + HCl \rightarrow LiCl + H_2O \tag{3}$$

$$Li_2S + 2HCl \rightarrow 2LiCl + H_2S \tag{4}$$

Hydrogen sulfide is liberated from solution as a gas which is brought using pipe 28 and is absorbed in an alkaline scrubber or reactor 30 with saturated caustic soda (NaOH) solution. Reactor 30 has a packed bed to enhance $H_2S$ absorption by caustic soda (NaOH saturated) solution. Upon completion of the reaction as indicted when $H_2S$ production ceases, the scrubber solution containing the contents in the reaction (5) below in reactor 38 using pipe 34 with hydrogen peroxide which is brought into reactor 38 by pipe 40. The reaction between the reactants in tank 38 is given by equation (5) and (6) below:

$$H_2S + 2NaOH \rightarrow Na_2S + 2H_2O \tag{5}$$

$$Na_2S + 4H_2O_2 \rightarrow Na_2SO_4 + 4H_2O \tag{6}$$

Some heating may be used to release out of the solution any remaining hydrogen sulfide and to concentrate the chlorides. At this point, the contents of reactor 38 are as follows:

In solution: lithium chloride and potassium chloride

Solids: lithium fluoride and aluminum oxide

The solids from reactor 38 are filtered out and sent "as is" to the aluminum industry. These solids comprise aluminum oxide and the lithium fluoride which are used as depolarizing agents during conventional aluminum manufacturing.

The liquid contents of reactor 38 are directed via pipe 52 to reactor 54 to precipitate the remaining lithium in solution as lithium carbonate. This precipitation is accomplished by reaction with salt solution, e.g., sodium carbonate aqueous solution (30% by weight) brought via pipe 56 into reactor 54. The reaction temperature will increase as a result from the heat of neutralization. The neutralization is completed at a minimum pH value of about 7.0 is represented by equation (7) below:

$$2LiCl + Na_2CO_3 \rightarrow Li_2CO_3 + 2NaCl \tag{7}$$

Subsequently, the temperature of tank 54 is increased to the range of 90° C. to 100° C. to reduce the solubility of lithium carbonate in water.

The slurry of lithium carbonate/water at 90° C. to 100° C. then is filtered in filter 60. The liquid with less than 1% by weight of lithium carbonate is either discharged to the effluent or recycled back to the water treatment step. Upon cooling this water may precipitate out some of the chlorides in solution, namely: potassium chloride and sodium chloride. These chlorides may be discharged to the local effluent.

The teachings of subject invention are described using a schematic representation of apparatus used which is illustrated in the single figure. The content of the solid waste are mainly unspent lithium, lithium fluoride, lithium sulfide, aluminum oxide and potassium chloride and potassium sulfide. The contents of the solid waste are removed using the chemical reactions in the foregoing manner. The method described used preferably hydrochloric acid, caustic soda, hydrogen peroxide. These compounds are mentioned as a way of illustration rather than as limitations. They can be resiliented by their equivalently without deviating from the teachings of subject invention. Therefore, it is the intent of the appended claims to cover all such variations and modifications as come within the spirit and scope of this invention.

What is claimed is:

1. The process for treating a solid reaction by-product of a reaction of lithium and sulfur hexafluoride wherein said by-product comprises primarily lithium sulfide, lithium fluoride, aluminum oxide and lithium said process comprises:

converting said lithium to lithium hydroxide by reaction with water;

converting said lithium sulfide and lithium hydroxide to a water soluble lithium salt by reaction with hydrochloric acid to produce hydrogen sulfide gas;

converting said hydrogen sulfide gas to a sodium or potassium sulfate; and recovering a mixture of lithium fluoride and aluminum oxide and converting remaining lithium in solution to lithium carbonate.

2. The process of claim 1 wherein said hydrogen sulfide gas is converted to sodium sulfate by treating it with sodium hydroxide solution and hydrogen peroxide.

* * * * *